United States Patent [19]
Long

[11] Patent Number: 4,949,356
[45] Date of Patent: Aug. 14, 1990

[54] PCM RECEIVER WITH LOCK STATE CONTROL

[75] Inventor: Christopher D. Long, Redondo Beach, Calif.

[73] Assignee: TRW Inc., Redondo Beach, Calif.

[21] Appl. No.: 213,393

[22] Filed: Jun. 30, 1988

[51] Int. Cl.[5] .......................... H03D 3/02; H04L 27/22
[52] U.S. Cl. ...................................... 375/86; 329/306; 375/119
[58] Field of Search ................. 329/50, 105, 122, 306, 329/304, 307, 310, 309; 375/82, 83, 85, 86, 97, 119, 10; 328/155; 371/1, 47; 455/317, 318, 323

[56] References Cited

U.S. PATENT DOCUMENTS

| | | |
|---|---|---|
| 3,238,459 | 3/1966 | Landee .................................. 375/85 |
| 3,242,262 | 3/1966 | Melas .................................. 375/119 |
| 4,027,265 | 5/1977 | Kobayashi et al. ................... 375/85 |
| 4,185,273 | 1/1980 | Gowan .................................. 375/87 |
| 4,700,347 | 10/1987 | Rettberg et al. ........................ 371/1 |

Primary Examiner—Benedict V. Safourek
Attorney, Agent, or Firm—Ronald M. Goldman; Ronald L. Taylor

[57] ABSTRACT

Lock state control is provided for the demodulator in a PCM receiver, including those demodulators using quadrature frequency shift keying, by selectively incrementally changing the phase of the received modulated carrier or of the "down converting" local oscillator. Switching means are provided to selectively shift the phase in multiples of 360/N degrees, where N is the number of available demodulation lock states, such as the number 4 in a quadri-phase system.

24 Claims, 3 Drawing Sheets

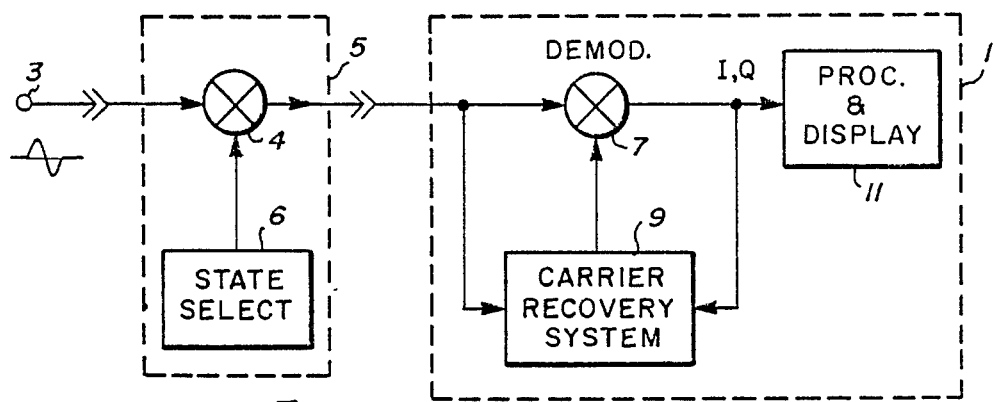
Fig_1
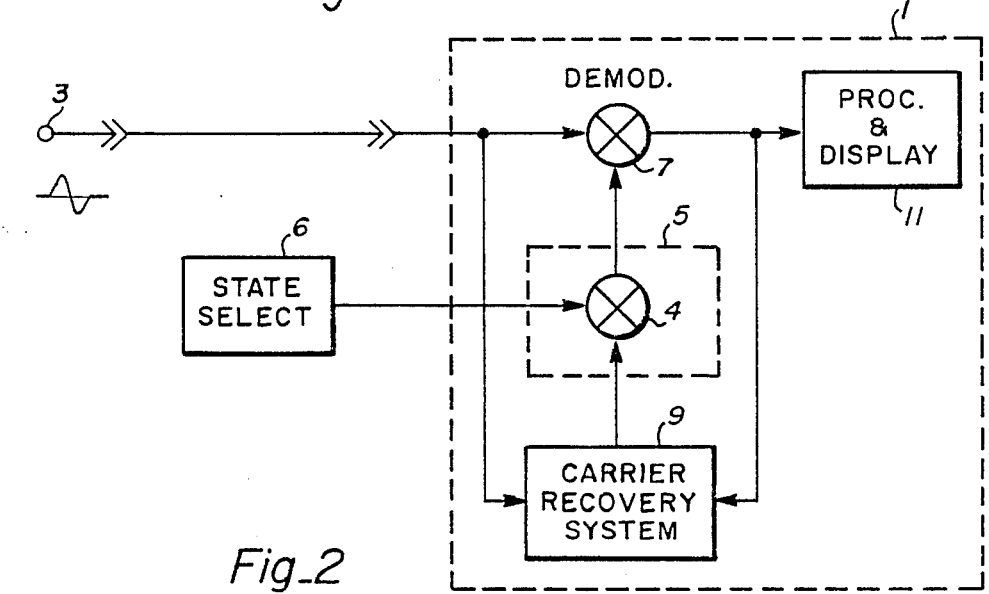
Fig_2
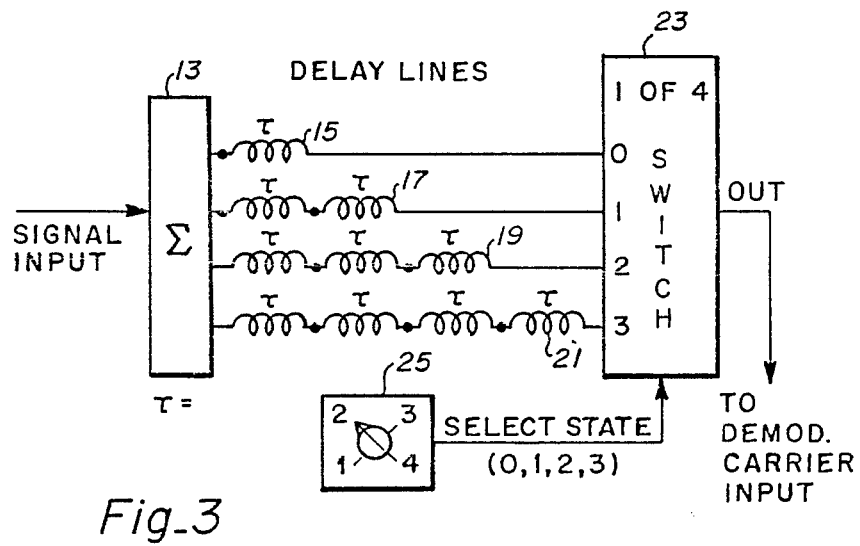
Fig_3

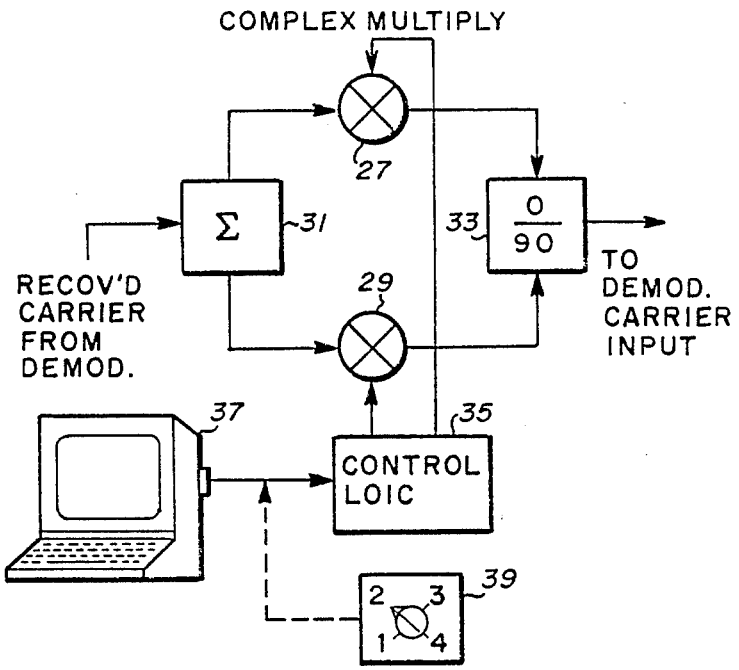
Fig_4
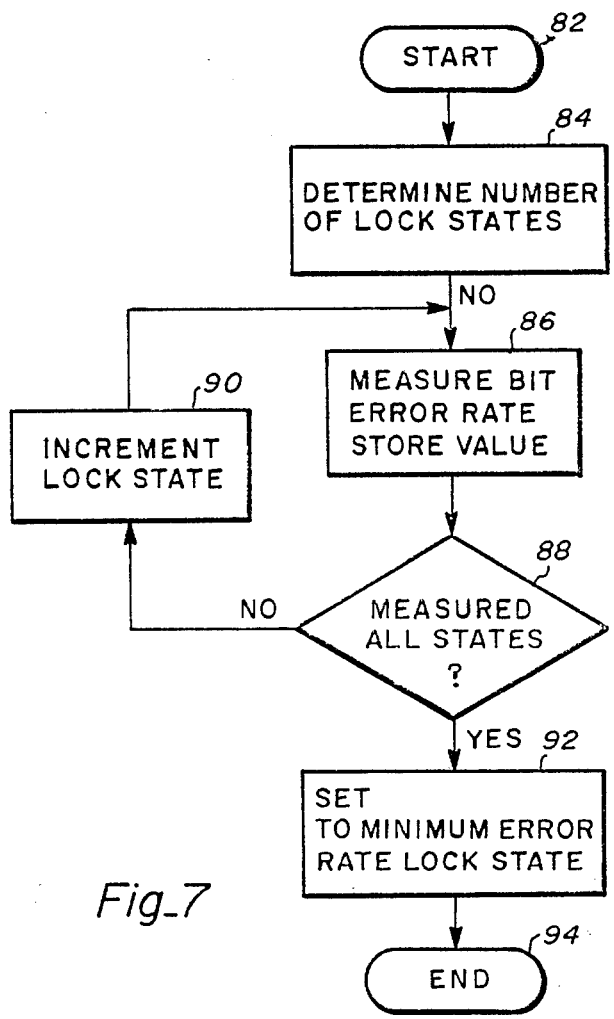
Fig_7

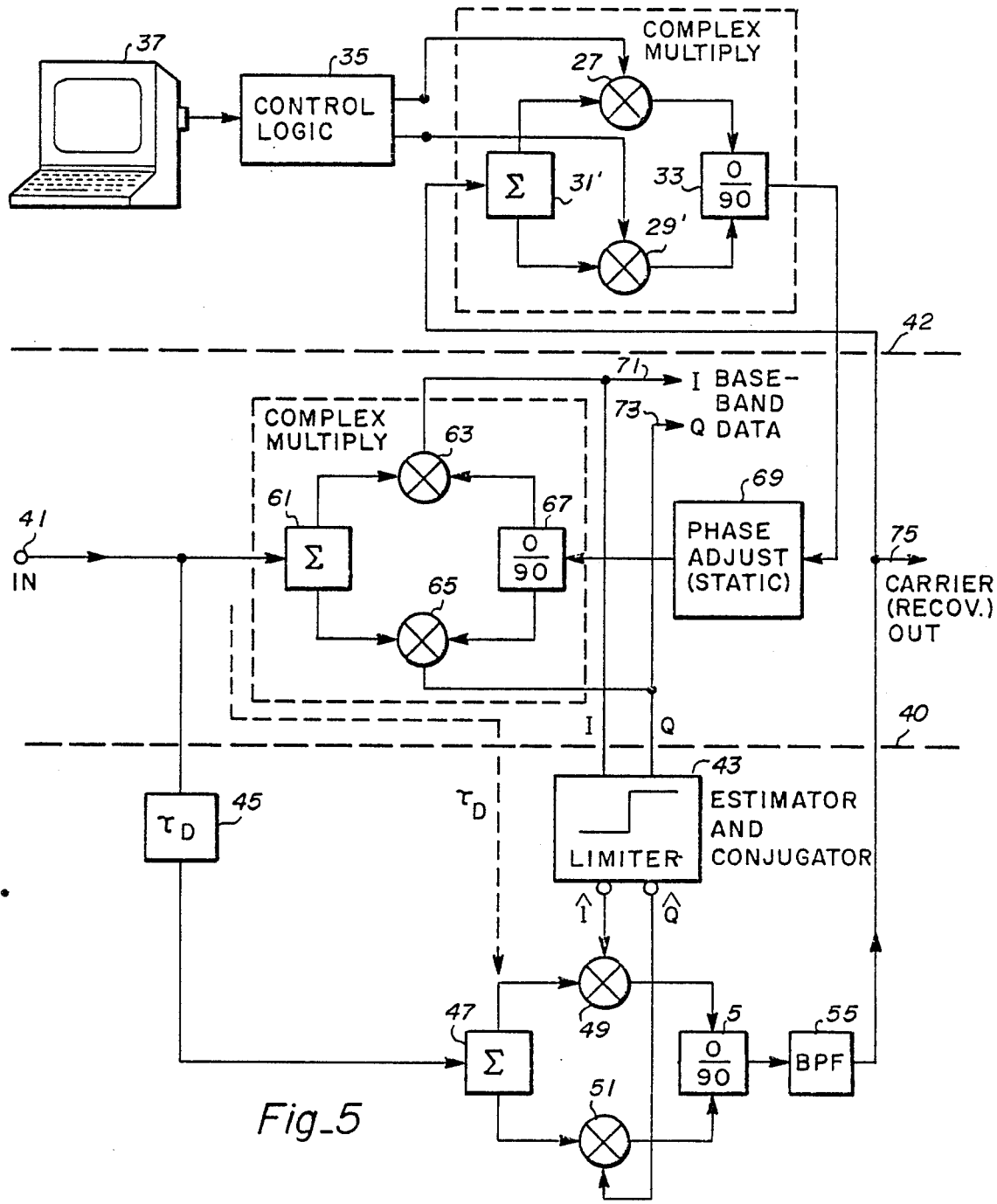
Fig_5
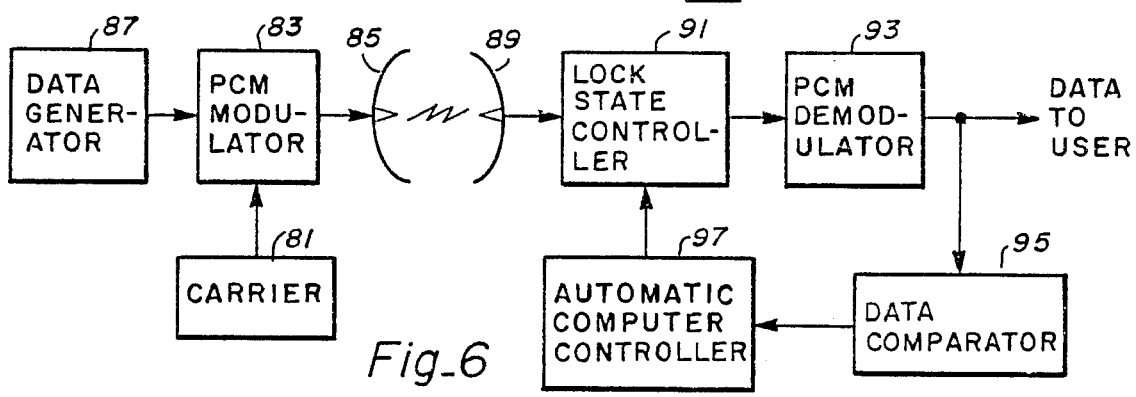
Fig_6

PCM RECEIVER WITH LOCK STATE CONTROL

This invention was made with Government support under F33657-87-C-3103 awarded by the Department of the Air Force. The Government has certain rights in this invention.

FIELD OF THE INVENTION

This invention relates to an improvement in PCM communications receivers of the type for receiving and demodulating PCM modulated carriers and, more particularly, to a lock state control for selectively setting the receiver's circuits into selected one of multiple permissible lock states; and to a method for changing the lock state of the communications receiver.

BACKGROUND

Communications systems used for the transmission of voice and data information from one location to another over telephone lines, fiber optic cable or radio links, the communications link, contain transmitters that send modulated RF signals, the modulated carrier, an RF carrier that is modulated with desired information for the remote location; contains a communications receiver at the other location, which receives the carrier and extracts, "demodulates", the information from the modulated carrier by a demodulator circuit and then further processes the information in its electronic form either for storage for later processing or for display. Familiar displays include the reproduction of voice conversations electro acoustically by a telephone receiver, an audible display; the presentation of received information on a cathode ray tube, a visual display; and like displays or any combination thereof.

Many types of modulation techniques are known, one of which is pulse code modulation, PCM. PCM transmission systems are characterized by changing the amplitude, phase, or both of a carrier signal to two or more unique conditions or states. Information is transmitted by determining the sequences of states, or state changes. Within that class of modulation technique is a Quadrature Phase Shift Keying technique, QPSK. Experience has shown the QPSK technique to be reliable and effective and hence QPSK type modulation is currently employed in many modern communication systems, including those used for telephone transmission and those used for enabling data communication with orbiting satellites. In a PCM system a communications link is established by the application of a modulated carrier that is received at the receiver and this transmission is maintained for long periods.

The present invention is concerned with PCM receivers. Various patents disclose receivers of this kind. One may make reference to the technical literature and to following patents for additional information on details of a variety of types and their operation. 4,525,676 granted June 25, 1985 to Atobe et. al., 4,518,922 granted May 21, 1985 to Luecke et. al., 4,716,579 granted Dec. 29, 1987 to Masterson, 4,682,117 granted July 21, 1987 to Gibson, 4,652,834 granted Mar. 24, 1987 to McAdam, 4,409,562 granted Oct. 11,1983 to Kurihara, 4,461,104 grated July 17, 1984 to Fujino, 4,574,244 granted Mar. 4, 1986 to Head, 4,562,404 granted Dec. 31, 1985 to Futakuchi, 3,990,015 granted Nov. 2, 1976 to Gordy et al., 4,691,176 granted Sept 1, 1987 to Hsiung et. al., 4,034,305 granted July 5, 1977 to Sato, 3,643,172 granted Feb. 15, 1972 to Rabow, 4,581,586 granted Apr. 8, 1986 to Rubin, and 4,361,894 granted Nov. 30, 1982 to Kurihara et al, which have been made known to applicant, provide examples of demodulation systems used with these classes of receiver and indicate some of the interest in this field.

One known type of QPSK type PCM receiver employs demodulator circuits which as part of their operation are required to "recover" the carrier from the incoming modulated carrier and for this purpose use a "demodulate and remodulate" recovery system, the details of which are available in the technical literature, including the patents aforecited.

Information is applied to the RF carrier at the transmitting end by phase shift modulation; that is, data is represented by a state or phase shift from the carriers reference or zero phase. In a four phase system this is represented by shifts from one of 90, 180, 270 and 360 degrees, by way example.

In essence demodulation of the carrier to recover the information represented in the phase shifts requires a local source of reference phase against which to compare the instantaneous phase of the incoming modulated carrier. Since the transmitter in a communication system is located remotely from the receiver at which demodulation takes place some means within the receiver must generate or simulate the received carrier absent modulation and be synchronized with the received carrier in order to provide a reference phase from which to make the comparisons. However the incoming carrier is modulated. Hence in this arrangement the incoming modulated carrier is first remodulated to effectively extract the original carrier without the modulation, thus locally deriving a carrier of the same frequency as the transmitted carrier, and the phase of the derived or recovered carrier signal is by the operation of the circuits synchronized, that is, "locked", to the incoming RF carrier. The demodulator also functions to derive the modulation information by comparing the instantaneous changes in phase in the modulation to the reference phase to which the derived signal is locked.

Essentially every PCM demodulator must re-create a version of the transmitted carrier in order to perform the data demodulation; this recreation is often referred to as "carrier estimation", representing a signal that is the best estimate of the original carrier. Using the carrier estimate, it is possible to demodulate the incoming modulated carrier to form a baseband version of the original data signal. This version is the original data corrupted by noise and possibly other undesirable effects of being passed through the communications channel. This derived baseband version is then used to form an estimate of the original data, which is a best guess at the data and, due to the signal corruption, may sometimes be in error.

Thus to successfully demodulate the incoming modulated carrier in the PCM type receiver, a locally derived signal, which may derive from the incoming carrier, is established and locked into one of the four phases. This electronic locking heretofore occurred in a quasi random manner as is later herein described, with the derived signal effectively being "locked" in synchronism to the incoming received carrier, and the signal remains so locked for so long as the communications link remains operating.

Further most receivers of this type contain circuits to adjust the phase of the derived signal to ensure that a proper reference or base signal is provided. For example if the modulation is a four phase modulation system, the modulation shifts the phase of the carrier by either 90, 180, 270 or 360 degrees. If the compensation circuits within the receiver detect a departure from these values, it automatically compensates by changing circuit values so that the outputs are restored to only those phase angles. A great number of the patents earlier identified describe compensation devices of one type or other for that purpose.

Given the derived locked signal as a reference, the departures in phase of the incoming signal to among and between any of the four states as caused by the modulation are detected, that is, demodulated, by being compared so to speak to the reference signal, to provide the demodulated codes represented by the changes in "state" or, as otherwise stated, by the phase shifts from the reference phase. A sequence of such codes represents information; considering the four states as A, B, C, & D, the demodulation of a sequence AABDCDDABAAC and the like represents information originally applied at the transmitter by modulating the transmitted carrier.

The integrity of a communications link is determined by the number of "bit errors" occurring within a given standard transmission, a characteristic measurable directly using commercially available bit error transmission test sets. In essence a test code is passed through the transmission system and the received code outputed is compared against the code that was sent. The number of errors as occurred is thus measured and a bit error rate is determined. The lesser the number of bit errors the better the communications link. Bit errors can be caused by many factors, one of which is electronic noise. For example, if the level of noise in the communications link at some moment exceeds the level of the signal, a bit error will occur. The demodulator can fall out of tolerance due to changes in circuit characteristics as a result of aging of electronic components or by the effects of temperature change, both causing a phase reference drift, hence lowering the quality of the signal processing circuits and thereby increasing the bit error rate in the link containing that circuit. For those same reasons the circuits usually contain the phase adjusting circuits to maintain the phase at the correct value, which were referred to previously.

A further known phenomenon associated with receivers of this type is that the demodulator circuit "locks" to the received carrier in any one of the available "states" or phases of the modulation. The electronic action that occurs in these demodulator circuits by which locking to one of the available modulation phases is somewhat akin to a roulette wheel. Assuming a four phase i.e., quadriphase, modulation system is analogous to setting a roulette wheel in motion with the wheel having four numbers. Where the wheel stops is the gamble. Moreso it is like a biased wheel, predisposed to stop at two of the four numbers. If the lock is broken as by interrupting the carrier and then reapplied, the wheel again spins and stops. Those not skilled in the art may consider the actual electronic action in greater detail by study of the technical literature.

It is also know that one of the available lock states is of higher quality, hence of a lower bit error rate, than the others. There is a definite difference in the performance of the demodulator as a function of the lock state, the relative phase. Usually one lock state gives a bit error rate that is as much as an order of magnitude better than the others. This quality difference is due to the amplitude and phase imbalances in the modulator and demodulator, as well as to the existence of unwanted "DC offsets" in the data paths. In designing the receiver circuits, an object is to have the circuit be of the same data estimation fidelity irrespective of which lock state the demodulator enters. In reality that objective cannot be realized or, if partially realized at the time of manufacture, departs even from that compromise in use over long periods of time, due to temperature and ageing effects.

Upon completion of manufacture the receiver is tested to ensure that the receiver performs in each of its lock states. In a testing operation, the modulated carrier is available at the workbench and its phase is known. Assuming a quadriphase system the signal is applied to the receiver, the receiver enters its lock state, one of four, each of which is known and a bit error rate measurement is made. The carrier is then interrupted and then reapplied, whereupon the receiver is unlocked and then again locks to the modulated carrier, in one of the four lock states, which could be the same lock state earlier measured in which event no measurement is taken and the carrier is again interrupted and reapplied. This procedure is repeated until the technician has successfully placed the receiver in each of the four lock states and made the required measurements. If the bit error rate for one lock state is substantially different from the others, then the technician may redo the circuit, and then retest. This is a time consuming process. If the modulation is eight phase or sixteen phase, the process is of even greater tediousness.

In practice it is found that the receiver in a quadriphase modulation system has a propensity to lock into two of the four lock states and a lesser propensity for locking into the other two, hence the reference to "quasi-random" self locking. The technician must repeatedly interrupt and reapply the carrier to the receiver. Eventually one succeeds in locking into each of the four available phases through this "hit or miss" procedure, although the time to accomplish that task is in applicant's view unnecessarily prolonged.

The technician ensures that each lock state performs to acceptable levels of bit error rate before shipping the receiver to the customer, ensuring that when the customer "plugs" the receiver into the communications system, the receiver performs no matter which lock state the receiver falls into in the "quasi random" manner previously described. That lock state, left to chance in that way, is not always the best one.

More sophisticated customers employ technicians to test the installed receiver in almost the same way that was undertaken at the factory. Thus knowing which lock state offers the optimum performance, the technician places the receiver in operation and uses measuring equipment to determine which lock state the receiver is in. If not in the desired lock state the technician interrupts the carrier and reapplies it, hoping that the receiver will at random lock into the desired state, repeating this time consuming process as necessary to do so.

I have recognized the tediousness and in my view an inefficiency attendant to the existing method of testing and deployment of this class of receiver, an inefficiency which others may also have recognized and failed to try to solve or cure or regarded as a normal part of the manufacturing process of these complex and simply overlooked devices. I have discovered a simple method and apparatus for permitting control of the lock state of this class of receiver; lock state control that eliminates that inefficiency in both manufacturing and deployment. An attendant advantage of the invention, in addition to improving the efficiency of testing procedures, is that the invention effectively enhances the useful life of receivers. The invention may be added to existing receivers without complex circuit modification to the receiver as an add-on accessory, allowing existing receivers to obtain this benefit.

Accordingly an object of the invention is to provide an improved PCM communications receiver, one which permits control of its lock state. An additional object is to increase the efficiency of the process of manufacturing and testing PCM receivers and their deployment in communications systems through reduction in the time required to perform tests of the receiver's various lock states at the conclusion of the manufacturing process as well as a reduction of the time required to place the receiver in the particular lock state that provides the best performance when deployed in a communications system. A further object of the invention is to provide in a PCM receiver a lock state controller that is easy to install, simple to operate and which may be fabricated using existing technology and electronic components. And a still further object is to provide a lock state control that may be coupled to existing PCM receivers as an after-market accessory attachment without requiring opening of the receiver and/or modification of the internal contents thereof.

SUMMARY

In accordance with the foregoing objects the invention is an improvement to a PCM receiver of the type adapted to receive a PCM modulated carrier in which the carrier modulation has plural phases or states and in which the receiver "self locks" to one of said plural modulation states to create a phase reference signal locally at the receiver for demodulating said PCM carrier, characterized by the inclusion of switching means for selectively changing in discrete increments the lock state of said receiver from among and between any one of the plurality of permissible lock states during the presence of a received PCM modulated carrier. In one specific aspect of the invention the carrier modulation is a quadraphase frequency shift keying type PCM modulation system and the switching means allows for switching of the phase from among four states increments of 90, 180, 270 and/or 360 degrees.

In a still another more specific aspect of the invention the phase switching means contains a plurality of delay lines, suitably formed of lengths of coaxial transmission line by way of example, to provide the required phase delays. As an alternative, the phase switching means comprises a complex multiplier of the same structure used as a remodulator in a demodulator remodulator type receiver. The switching means is located in the incoming carrier signal path in one arrangement disclosed and is located in the signal path of the recovered or replicated carrier path of the demodulator section of the communications receiver.

The foregoing and additional objects and advantages of the invention together with the structure characteristic thereof, which was only briefly summarized in the foregoing passages, together with additional advantages and alternative structure becomes more apparent to those skilled in the art upon reading the detailed description of the preferred embodiments, which follow in this specification, taken together with the illustrations thereof presented in the accompanying drawings.

DESCRIPTION OF THE DRAWINGS

FIG. 1 illustrates in block diagram form a first embodiment of a PCM receiver according to the invention;

FIG. 2 illustrates in block diagram form a second embodiment of the invention;

FIG. 3 is a schematic illustration of a phase switching device used in the foregoing embodiments;

FIG. 4 is a schematic illustration of an alternative switching device used in the foregoing embodiments;

FIG. 5 illustrates in block diagram form a specific quadrature frequency shift keying type PCM containing the invention;

FIG. 6 illustrates in block diagram form a lock state control having automatic control; and FIG. 7 illustrates a flow chart of the operation carried out by the automatic embodiment of FIG. 6.

DETAILED DESCRIPTION OF A PREFERRED EMBODIMENT

Reference is made to FIG. 1 which illustrates the demodulator portion of a conventional receiver in symbolic block diagram form for convenience the nature of which is understood by those skilled in the art and the modifications made to the conventional receiver to incorporate the improvement disclosed invention. As shown a PCM receiver of conventional structure is represented in block 1 together with the lock state controller added by the present improvement. The circuit includes input 3, lock state controller 5 that contains an associated complex multiplier 4 and state selector 6, a demodulator 7, and a carrier recovery system 9, the output of which is fed into a second input of the demodulator, and further processing and display circuits generally represented by block 11 the details of which are known and are not necessary to an understanding of the present invention. The carrier recovery system may be of any conventional type such as the phase locked loop, PLL, the Costas type and/or the demodulator remodulator type. A modulated RF carrier is applied at input 3 and passes through the lock controller 5, the details of which are hereinafter described in greater detail. This modulated carrier may be of any type for example, QPSK, QAM, 8PSK and the like and the other elements of the circuit though generically represented have the known necessary elements used with the kind of modulation chosen. The carrier passes through lock state controller 5, which for the present is assumed to leave the carrier unchanged and is applied to the input of both demodulator 7 and to carrier recovery system 9.

As shown the PCM receiver in FIG. 1 is configured as a conventional one: An input is applied to demodulator 7 which is represented as a "complex multiply" device known in the art later herein briefly described. The output of that demodulator is fed to processing circuits 11 and to an input of the carrier recovery system, the latter of which forms a feed back type circuit. In turn the output of the carrier recovery system is fed to the second input of demodulator 7. The output of the demodulator is represented as provided in phase and quadrature (I, Q) complex baseband data and is also applied to an input of carrier recovery system 9 as required by the known principles of operation of that circuit. The carrier recovery system operates in a conventional manner known to those skilled in the art. State selector switch 6 is a single pole multiple throw switch, which may be a rotary switch and may be of the make before break variety. Selector switch 6 is accessible to and operable by the technician or other user.

By switching relative phase relationship between the recovered carrier and the incoming "data" by ninety degrees, or an integer multiple thereof, the demodulator tracks on a new lock state. The switching must occur on the same order of switching speed as the signal data switching speed or modulation rate, as variously termed, for example one nanosecond, and may be completely asynchronous to the incoming data. As seen by the demodulator, the demodulator only knows that a phase change has taken place; it cannot tell the source of the phase change.

FIG. 2 illustrates symbolically another embodiment of the invention that is identical in all respects with the embodiment of FIG. 1, except that the lock state controller is located in the circuit between the output of carrier recovery system 9 and demodulator 7. In all respects the circuit functions in the same manner as the circuit of FIG. 1 and need not be described further. In this instance the lock state controller selectively shifts the recovered carrier phase in multiples of 360/N degrees of the recovered signal, while to the demodulator the same change in relative phase occurs between the inputted carrier signal and the recovered carrier signal as occurs in the prior embodiment in which the inputted carrier was shifted.

FIG. 3 schematically illustrates in greater detail one embodiment of a lock state controller used in connection with the embodiments of FIGS. 1 and 2, wherein the former embodiments are used with a QPSK system, that is a phase shift modulation system containing four states. In this the input signal is applied to splitter 13 the output of which is connected to one end of four delay lines, 15, 17, 19, and 21, each of which may consist of an appropriate length of coaxial cable. The other ends of the delay lines are connected to the input of a switch 23, a digital electronic switch that has a switching speed that is as fast or faster than the modulation rate of the modulation in the modulated carrier, which may comprise a multiple combination of fast acting field effect transistors.

A selector switch 25 accessible to the user is operated by the user to select one or the other of the states of switch 23, thereby permitting the user to select the appropriate delay and thereby the particular lock state into which the receiver is placed.

The output of switch 23 serves as the output of the delay circuit which is coupled to the demodulator in the embodiments presented in FIG. 1 and 2. The delay lines are of a length that they delay the input signal by an appropriate amount equal to some multiple of ninety degrees of phase difference at the IF frequency of the data.

Thus in a four phase system delay line 15 provides a delay of 90 degrees; delay line 17, a delay of 180 degrees; line 19, a delay of 270 degrees; and line 21, a delay of 360 degrees, which is the same as zero. It is understood that with a modulation system having eight phases, then eight delay lines are provided which provides delays progressing in amount in multiples of 45 degrees of shift, that is 45, 90, 135, 180, 225, 270, 315, and 360 degrees, and with a signal with 16 modulation states sixteen delay lines would be used that increment delays in 22.5 degree increments. Generally for a modulation containing N states the number of delay lines would also equal N and the increments in delay expressed in terms of degrees is (360/N) (*p), where p ranges from the integers 1 through N. For quadrature amplitude modulation (QAM), less than N delay lines may be required.

A second embodiment of the lock state controller portion, also designed for a system in which the modulation is of any PCM modulation format, as may be used in the embodiments of FIGS. 1 and 2 is schematically illustrated in FIG. 4, which I refer to as a complex multiply type of controller. In contrast to the straightforward and easily understood form of creating the delays presented in the embodiment of FIG. 3, the selection of a phase shift in this embodiment is more complex and less easily understood by persons not skilled in the art.

As those skilled in the art recognize the lock state controller is in fact the structure of a PCM modulator, which has been applied to the lock state control function, and can modulate either the recovered carrier as represented in figure 1 or the incoming carrier as shown in FIG. 2. This contains first dual-phase multiply circuit 27, a second dual-phase multiply circuit 29, a power splitter 31, a coupler 33, a switch 35 and a logic controller 37, the later of which is represented as a computerized controller. In this embodiment a computerized desk top controller, suitably the HP series 300 controller, containing a keyboard to allow user input, and an output port coupled to a digital logic switch, which provides a 1 of 4 output, the latter of which is connected to the phase modifying components, either the complex multiplier and or the delay lines, permits the user to select the particular phase shift increment. The user taps out the appropriate code on the keyboard, the computer translates this to a corresponding code provided at the output port that is input to the digital logic circuit. The latter switching circuit provides the appropriate switch selection of the phase shifting elements.

As indicated in dash lines, an alternative form of selector may be substituted in the above arrangement, such as selector switch 39, which the user can manually set in position as was the case in the embodiment of FIG. 3.

The modulator can be inserted into the recovered carrier line, and when the I-Q data pattern is switched very quickly, the modulator changes the phase of the output recovered carrier by +90, −90, +180 or 0 degrees, depending upon the setting of the selector switch.

One determines the present relative phase or lock state; determines how many 90 degree phase shifts are necessary to bring the phase to the desired lock state. Once determined, the new data is presented to the I-Q modulator, or in the alternative embodiment, the correct length of transmission line is selected and the selector is set to the proper position. The demodulator now tracks in the desired lock state.

This lock state controller can be configured to provide N different phase shift conditions, by suitable selection of sine and cosine amplitudes to dual-phase modulators 27 and 29, thus controlling the lock state of any arbitrary PCM modulation format. The controller can be used for multiple format control by simple software changes in the computer controller.

FIG. 5 shows a QPSK demodulator that uses the demodulation & remodulation technique for recovery of a coherent carrier signal and one embodiment of the lock state controller. For ease of understanding the remodulator portion lies under dash line 40; the demodulator portion is located between dash lines 40 and 42;

and the lock state controller elements are located above dash line 42. Since QPSK has no amplitude variation from symbol to symbol, the "data estimator" and "conjugator"' 43 may consist of limiting and inverting functions. A time delay 45 is included in the signal path to the remodulator portion to compensate for the time delay through the data estimator and conjugation path. The absolute relative phase of the recovered carrier is adjusted by the phase shifter feeding the demodulator carrier input.

One may first consider the operation of the modulator demodulator type system, without taking into account the lock state controller function. Acquisition of this circuit is straight forward. Assume that there is no data at the output of data estimator 43 and that no carrier signal is presented to the demodulator at input 41. Under those circumstances, the output of the remodulator portion at the output of 53 is a version of the QPSK signal. That signal, following filtering by bandpass filter 55, serves as the initial carrier to demodulator via static adjust circuit 69. Statistically, a time occurs at which the delayed version of the QPSK signal and the instantaneous phase of the signal are in the proper phase relationship for accurate data demodulation and estimation. Even if this occurs only for a data symbol or two, this accurate estimate increases the quality of the recovered carrier, which increases the quality of the data estimate, forming a cycle with positive feedback. The final demodulator lock state is attained in which the remodulated carrier is the same as the original carrier and the data estimates are identical to the original data, limited only by channel distortions and noise.

In the presence of electronic noise, however, the data estimates are not perfectly correlated to the original data stream. This causes a residual modulation of the recovered carrier, and can be modeled as phase jitter. The bandpass filter in the recovered carrier path serves to smooth out the phase jitter caused by this residual data error and removes the higher order mixing terms. Much analysis on the effects of bit errors on recovered carrier phase noise and resultant error rates for this class demodulator has been done in this field. According to such analysis the carrier recovery system has negligible error induced jitter if the bit error rate is low, that is $10e^{-6}$ or lower.

Given the system has acquired the carrier, one notes that there are four stable phase relationships or "states" between the actual carrier and the recovered carrier. In other words, depending on the exact phase trajectory of the recovered carrier during the acquisition, the final recovered carrier phase can be in one of four positions relative to the modulated carrier. This is normally of no consequence, since differential encoding of the transmitted symbols makes the absolute phase of the demodulating carrier irrelevant. It is noted that this absolute phase ambiguity can occur in any PCM demodulator, whether a demodulator remodulator type as was described in the foregoing example, Costas PLL and other, and given any modulation format. It is an inherent property of an in phase and quadrature type modulation format.

In one selected test a PCM receiver of the QPSK type receiving a 10 GHz carrier modulated by a 1 Gigabit rate 4 state modulation signal had its lock state selectively changed.

Although I have described the invention in reference to an RF carrier it is understood that it is applicable to receivers designed to operate at other frequencies as well and with different forms of modulation. Thus the carrier may be one that falls within audio frequencies, which are lower than RF, and may operate with carriers that fall within the optical range, which are higher than RF and that are known to be under development. Further the carrier may be one which has been downconverted to a lower intermediate frequency, IF, in accordance with known superhetrodyne type receivers. The carrier may be of the FM frequency division multiplex type, and the PCM carrier may be a subcarrier on this carrier, all of which fall within the scope of the invention and fall within the meaning of carrier as used herein as is recognized by those skilled in the art upon reading this specification. Thus in referring to carrier or RF carrier, it is intended to include within the scope of that term all known types of phase modulated signals, whether using light, audio frequencies, IF frequencies, RF frequencies, Microwave frequencies and so on.

As another example of the versatility of application to PCM receivers operating at either high or low frequencies, the familiar Hayes brand 1200 band modem used with personal computers is a QPSK type PCM receiver that generates a carrier in the audio range suitable for transmission over ordinary telephone lines. According to the present invention lock state control may be added to that modem by the attachment in the signal path of the phase switching circuit as taught and described herein.

Although I have described the invention in connection with manual selection of the lock state by the user, alternative embodiments of the invention may incorporate apparatus to automatically make the selection of the lock state, suitably the lock state having the lowest bit error rate such as represented in the block diagram of FIG. 6. Initially a pcm signal is sent over the link and the elements in the receiver synchronizes and enters one of the lock states in the quasirandom manner earlier described in connection with the prior embodiments. In this embodiment of an automatic test arrangement by prearrangement the remote transmitter, represented by a carrier generator 81, PCM modulator 83 and antenna 85, sends a carrier modulated with a predetermined test code applied to the modulator by data generator 87, which is received at receiving antenna 89, and passes through the lock state controller 91 and then to demodulator 93.

The test code data is demodulated and compared with the known predetermined test code stored within data comparator 95, resulting in a determination of the bit error rate for the then existing lock state. Bit errors are counted and usually displayed or interpreted as a probability of bit error, such as $1.25 \times 10^{-5}$. At each lock state the bit error rate is measured and stored in the memory of computer 97; the computer then increments or steps the lock state controller to the next lock state and measures the bit error rate of the next lock state, again storing the result of the measurement in memory, stepping the lock state controller to the next state, and so on, until all lock states are measured at least once. The result is an array of N bit error rate values, corresponding to the N possible lock states of the demodulator. Thereupon the computer sets the lock state to that determined to have the lowest bit error rate. The operator at the remote station is then called and requested to remove the test modulation and apply the information modulation so that the receiver is placed in use.

A flow chart is represented in FIG. 7 that shows the logical sequence carried out by the embodiment of FIG.

6. Block 82 represents the start; the number of lock states is determined, block 84; the error bit rate is measured and the determined value is stored, block 86; a determination is made as to whether all lock states have been measured, block 88. A negative determination initiates the increment of the lock state, block 90, resulting in the measurement being repeated in the new lock state. A positive determination at block 88 initiates an instruction to set the lock state controller to the state determined to have the minimum error rate, block 92, the lowest stored value as at block 86; and the process terminates as a block 94.

It is also possible to install a signal system that permits the computer to initiate a test without operator intervention at the sending end of the communication link, which represents a further degree of automation of the test process. In such an arrangement a remote control receiver at the sending end receives a coded signal over the communications link originating from a signal source initiated by the computer at the receiving end. The remote control receiver is arranged to control and apply the test code to the modulator of the PCM transmitter, preventing application of the regular data to the modulator. Following operation of the test, as earlier described, to locate and select the lock state with the lowest bit error rate, the computer then causes the signal source to send an end of test signal to the remote control receiver; the latter then removes the test signal and applies the regular data to the modulator for normal data transmission.

In still other embodiments of the invention the communication link could be tested on a real time basis and any adjustment in the lock state may be made essentially continuously. For example, if the communication link transmits data at a rate of 1,000 bits per second, one could use every 1,000th bit to form a channel at a 1 bit per second rate. The test pattern is transmitted on this time division based channel, which is typical of time domain multiplex TDM, type transmission systems. Since the bit error rate is available continuously, one sets the controller to alert the operator if the error rate degrades past a predefined limit. The operator can then activate the above described automatic procedure to reoptimize the lock state.

It is believed that the foregoing description of the preferred embodiments of the invention, including the description contained in the appended claims which forms a part of this specification, is sufficient in detail to enable one skilled in the art to make and use the invention. However, it is expressly understood that the details of the elements which are presented for the foregoing enabling purpose is not intended to limit the scope of the invention, in as much as equivalents to those elements and other modifications thereof, all of which come within the scope of the invention, become apparent to those skilled in the art upon reading this specification. Thus the invention is to be broadly construed within the full scope of the appended claims.

What is claimed is:

1. In a communications receiver for receiving at a receiver input and demodulating a phase modulated RF carrier to obtain information contained in said modulation, said modulation characterized by phase changes occurring at a predetermined rate, $T_r$, between a predetermined number of phase states, N, said number being an integer between 2 and N, with each of said phase states representing a permissible lock state, said receiver including:

demodulator means for deriving information signals from said modulation, said demodulator means including:
    demodulator input for receiving a modulated RF carrier;
    means for deriving from said received modulated RF carrier an unmodulated RF carrier at the frequency of the received carrier;
    means for synchronizing and maintaining the synchronism the phase of said derived unmodulated carrier to one phase of said received modulated RF carrier to establish a reference phase, including circuit means for permitting said received RF carrier and said derived carrier to lock into a phase synchronism lock state in any one of N states in a self determining random manner to represent a permissible reference phase relationship and including automatic adjusting means; said phase synchronism being interrupted upon interruption of said received modulated carrier to said demodulator input; and
  means for detecting and outputing changes in state of said received RF carrier from said reference phase and any one of said N states to another one of said N states occurring at a rate of Tr; the improvement comprising:
  selectively operable phase changing means for selectively incrementally changing the relative phase between the received RF carrier and said reference phase by an increment of (n−1) *360/N degrees, where n represents the number of any of the possible phase states of the modulation of said received carrier to change the lock state between said carrier and said derived carrier, n being any number between 1 and N, said number N representing the number of possible lock states for the given modulation type applied to the receiver;
  said phase changing means being capable of changing said carrier phase within an interval equal to or less than said predetermined rate of change of said phase shift in said modulation, $T_r$, whereby the lock state is selectively changed without disconnection of said received RF carrier.

2. The invention as defined in claim 1 wherein said phase changing means includes:
  selector switch means;
  at least N delay lines for providing time delays in multiples of 360 degrees/N of phase shift at the frequency of said rf carrier;
  said selector switch means for placing a selected one of said delay lines in series circuit with said received RF carrier.

3. The invention as defined in claim 2 wherein said delay lines each comprise a coaxial cable, said coaxial cables being of different length.

4. The invention as defined in claim 2 wherein said selector switch means comprises a digital electronic switch.

5. The invention as defined in claim 1 wherein said phase changing means includes:
  selector switch means;
  a plurality of delay lines for providing time delays in multiples of 360 degrees/N of phase shift at the frequency of said received rf carrier;
  said selector switch means for placing a selected one of said delay lines in series circuit with said received RF carrier.

6. The invention as defined in claim 1 wherein said phase changing means is located intermediate said receiver input and said demodulator input.

7. The invention as defined in claim 1 wherein said phase changing means is coupled in circuit between said synchronizer means and said detecting means for incrementally changing the phase of the derived carrier signal, whereby said phase changing means is adapted to increment a change in phase to the derived carrier that is input to said demodulator.

8. The invention as defined in claim 1 wherein said phase changing means further comprises:
first dual-phase multiply circuit means having two inputs and an output;
second dual-phase multiply circuit means having two inputs and an output;
splitter means having an input and two outputs, said outputs being connected to respective one of the inputs of each of said first and second complex multiply circuit means;
quadrature output coupler means having two inputs and an output, said inputs being connected to a corresponding one of the outputs of said first and second complex multiply means;
said output of said coupler means providing an output of the phase changing circuit;
digital electronic voltage source means having an input and a pair of outputs, said outputs being coupled to the remaining inputs of said complex multiply circuits for controlling the state thereof; and
control means for controlling said digital electronic voltage source means.

9. The invention as defined in claim 8 wherein said control means of said phase changing means further comprises: user operated control means, including computer means, for receiving manual input by a user and an output for providing a selection code for said digital electronic switch, whereby the state of said digital electronic switch may be changed.

10. The invention as defined in claim 8 wherein said control means comprises automatic means for controlling said digital electronic voltage source.

11. The invention as defined in claim 11 wherein said automatic means further comprises:
computer controlled means responsive to detection of a carrier for sequentially changing the output of said digital voltage source means for a predetermined interval to place said PCM receiver in each of the available lock states for a predetermined interval each, said computer controlled means, including: means for measuring the bit error rate of said PCM receiver in each of said available lock states; and means responsive to completion of measurements outputting a control code to said digital voltage source means for placing said voltage source means in the lock state corresponding to the lowest measured bit error rate.

12. The invention as defined in claim 1 wherein said phase changing means includes:
manually operable control switching means for permitting phase change by a user;
digital electronic switch means for setting the increment of phase shift responsive to a code applied to an input of said digital electronic switch means;
said control switching means for providing a selection code for said digital electronic switch, whereby the state of said digital electronic switch changes to that state set by said code.

13. The invention as defined in claim 1 wherein said phase changing means includes:
control switching means for selectively setting phase, said control switching means including computer means for automatically determining the one of the N lock states having the lowest bit error rate and providing an output indicative of said selected lock state; and
digital electronic switch means for setting the increment of phase shift responsive to a code applied to an input of said digital electronic switch means;
said control switching means for providing a selection code for said digital electronic switch, whereby the state of said digital electronic switch changes to that state set by said code.

14. The improvement to a pulse code modulated receiver of the type for receiving a pulse carrier modulated carrier from a carrie source, wherein said carrier is of a predetermined frequency of F cycles per second and has plural modulation states with such modulation being characterized by phase changes occuring between said plural modulation states at a predetermined rate, Tr, said receiver having a plurality of permissible lock states with said plurality of lock states being equal to or less in number than said plural modulation states, and in which said receiver locks initially to one of said lock states in a self determining manner upon receiving said carrier to create a phase reference signal at the receiver for demodulating said pulse code modulated carrier and initially establish a first relative phase between the phase of said pulse code modulated carrier and the phase of said phase reference signal to derive data information carried by said carrier, with said receiver being capable of deriving said data information in any of the plurality of lock states said receiver is initially locked, comprising in combination:
lock state control means for permitting a selective change in the lock state of said receiver during the continuing reception of said received pulse code modulated carrier from among and between any one of said plurality of permissible lock states in which said receiver is locked and any other one of said lock states so that said data information may be obtained from said receiver over succeeding cycles of said carrier with said receiver being in said other lock state, said lock state control means including phase changing means for selectively incrementally changing said relative phase between said pulse code modulated carrier and said reference phase signal by an increment equal to a multiple of the quantity (360/P degrees), where P is a number equal to said plurality of lock states, within an interval equal to or less than said predetermined rate, Tr, to prevent unlocking of said receiver.

15. The invention as defined in claim 14 wherein said phase changing means includes:
a plurality of delay lines, corresponding in number to the number of modulation states and each delay line providing a corresponding one of a plurality of P delays of (p−1)360/ P, where p is an integer ranging from 1 to P and where P represents the number of permissible lock states of the receiver, whereby a first one of said delay lines providing a first delay of 0 degrees, a second one of said delay lines providing a second delay of 360/P; ... and said Pth one of said delay lines providing a pth delay of (P−1) 360/P degrees between an input and output thereof;

switch means, said switch means containing one pole for each of said plurality of delay lines; an end of each said delay line being connected to a corresponding one of said poles; said switch means being selectively operated to a given pole to select a corresponding delay line.

16. The invention as defined in claim 14 wherein said receiver includes a receiver input for receiving a carrier and wherein said receiver includes a demodulator having a demodulator input; said lock state control means further comprises means for selectively incrementally changing the phase of the received carrier between said receiver input and said demodulator input in an increment of n (360/N), where n is an integral number in the range of 1 through N and where N is the number of modulation phases in said carrier signal.

17. The invention as defined in claim 14 wherein said receiver includes carrier recovery means containing an output for producing a recovered carrier and wherein said receiver includes a demodulator having a demodulator input; said phase changing means of said lock state control means further comprises means for selectively incrementally changing the phase of the recovered carrier between said carrier recovery means output and said demodulator input in an increment of n (360/G) degrees, where n is an integral number in the range of 1 through and where G is the number of available lock states.

18. The improvement to a PCM receiver of the type adapted to receive a PCM carrier having plural modulation states, each of which defines a permissible lock state for said receiver, in which said receiver locks to one of said plural modulation states to create a phase reference signal at the receiver for demodulating said PCM carrier, comprising in combination:
lock state control means for permitting a selective change in the lock state of said receiver during the continued reception of a received PCM carrier from among and between any one of the plurality of permissible lock states, said lock state control means comprises further: phase changing means for changing said lock state, said phase changing means including:
first dual-phase multiply circuit means having two inputs and an output;
second dual-phase multiply circuit means having two inputs and an output;
splitter means having an input and two outputs, said outputs being connected to respective one of the inputs of each of said first and second complex multiply circuit means;
quadrature output coupler means having two inputs and an output, said inputs being connected to a corresponding one of the outputs of said first and second complex multiply means;
said output of said coupler means providing an output of the phase changing means;
digital electronic voltage source means having an input and a pair of outputs, said outputs being coupled to the remaining inputs of said complex multiply circuits for controlling the state thereof; and
voltage source control means for controlling said digital electronic voltage source means.

19. The invention as defined in claim 18 wherein said voltage source control means further comprises: user operated control means, including computer means for receiving manual input by a user and an output for providing a selection code for said digital electronic voltage source, whereby the state of said digital electronic voltage source may be changed.

20. The invention as defined in claim 18 wherein said voltage source control means comprises automatic means for controlling said digital electronic voltage source means.

21. The invention as defined in claim 18 wherein said voltage source control means further comprises:
computer controlled means, said computer controlled means including means responsive to detection of a carrier for sequentially changing the output of said digital voltage source means for a predetermined interval to place said pulse code modulated receiver in each of the available lock states for a predetermined interval each; measuring the bit error rate of said PCM receiver in each of said available lock states; and responsive to completion of measurements outputing a control code to said digital voltage source or switch means to place said means voltage source or switch in the lock state corresponding to the lowest measured bit error rate.

22. In combination with a modulated carrier receiver for receiving a modulated carrier transmitted from a modulated carrier source characterized by modulation occurring at a given rate represented by changes in phase of said carrier amongst a plurality of available integral number of phase states, said modulated carrier receiver being of the type that includes demodulator circuit means for locking to the received modulated carrier to provide a reference phase signal for demodulating modulated carrier signals applied at an input of said demodulator circuit means and defining thereby a fixed phase relationship between said phase reference signal and said carrier from among a plurality of available integral number of phase states in said received modulated carrier, said demodulator circuit means having the characteristic of initially locking into any one of a plurality of available lock states, equal to or a submultiple of said plurality of phase states of said received modulated carrier, in a quasi random manner upon receiving said carrier to determine said reference phase, the improvement comprising: lock state controller means for permitting selective incremental change in the phase of said signals inputted into said demodulator circuit means during the presence of said modulated carrier in an integral multiple of the factor F, where F equals 360 degrees divided by the number of available lock states, to change said reference phase signal relative to the phase of said carrier without unlocking said demodulator circuit means, said incremental change being made at a faster rate that said given rate; said lock state controller means being located remote from said source of modulated carrier and proximate said receiver means.

23. The invention as defined in claim 22 wherein said lock state controller means includes means to change said phase at a rate of change equal to or greater than the rate of phase change occurring in said modulation.

24. The method of optimizing the performance of a communications receiver, said communications receiver being of the kind including circuit means for locking in one of a plurality of avaialable lock states to an applied received modulated carrier signal, said carrier signal having N modulation states, N representing any integer number greater than two, to define with said receiver N or less available lock states for the receiver and including means for deriving locally within said receiver a modulation free signal corresponding to said carrier signal for use as a reference signal in demodulating said modulated carrier signal to extract data information carried by said modulated carrier signal, responsive to said circuit means being locked into any one of said lock states initially; a modulated carrier signal modulated with predetermined data information, and a second source of said predetermined data information, comprising the steps of:

applying a modulated carrier signal to said receiver, with said modulation containing predetermined data information, whereby said receiver assumes a first lock state and provides said predetermined data information;

comparing the data information obtained from said receiver to said predetermined data information from said second source to determine the existance of errors in the data information received from said receiver and establishing a bit error rate associated with said first lock state;

maintaining said modulated carrier applied to said receiver and selectively incrementally changing the relative phase between the received modulated carrier signal and said modulation free signal corresponding to said carrier signal by an amount of n (360/G) degrees, where n is any selected integer from 1 to G, where G is the number of available lock states and is no greater than N with said incremental change being accomplished in an interval no greater than the interval required for the modulated carrier signal to change from one modulation state to another to thereby change said receiver to another one of said lock states represented by the incremental change of phase selected without unlocking said receiver from said modulated carrier signal.

repeating the foregoing steps for each of the remaining lock states to determine the bit error rates for each of the available lock states;

comparing the bit error rates obtained in the preceding steps; and changing the lock state of said receiver to the one of said lock states having the lowest bit error rate by selectively changing the relative phase to that increment of phase associated with such lock state.

* * * * *